H. C. SEELY.
Extension-Carriage.

No. 223,545. Patented Jan. 13, 1880.

WITNESSES:
Henry N. Miller
C. Sedgwick

INVENTOR:
H. C. Seely
BY Munn & Co
ATTORNEYS.

UNITED STATES PATENT OFFICE.

HORACE C. SEELY, OF PHILADELPHIA, PENNSYLVANIA.

EXTENSION-CARRIAGE.

SPECIFICATION forming part of Letters Patent No. 223,545, dated January 13, 1880.

Application filed August 1, 1879.

*To all whom it may concern:*

Be it known that I, HORACE CLINTON SEELY, of Philadelphia, in the county of Philadelphia and State of Pennsylvania, have invented a new and useful Improvement in Extension-Carriages, of which the following is a specification.

Figure 1:
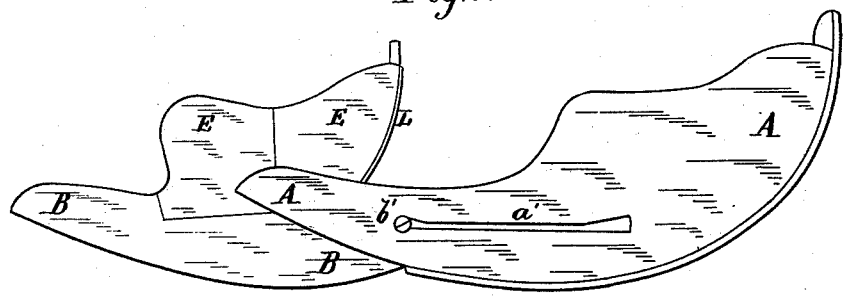
Figure 2:
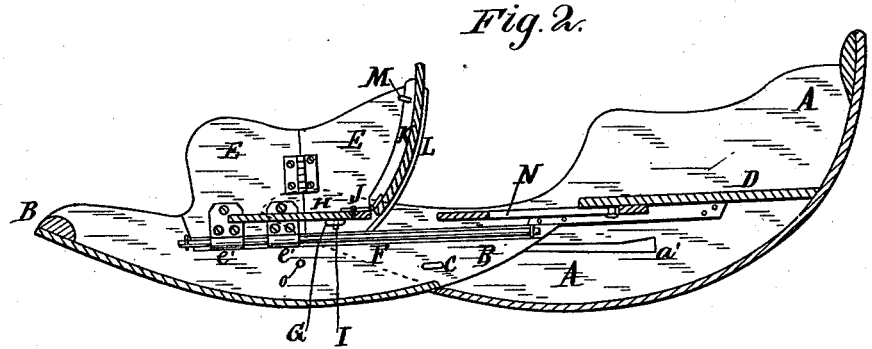
Figure 3:
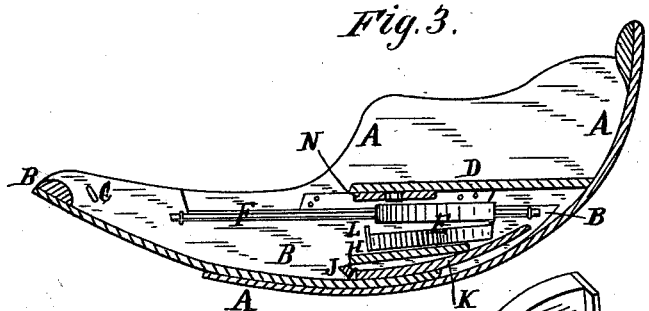
Figure 4:
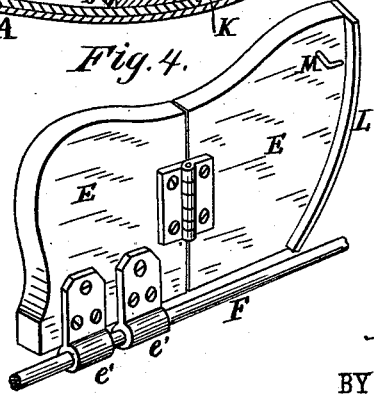

Figure 1 is a side view of the body of my improved carriage extended. Fig. 2 is a vertical longitudinal section of the same extended. Fig. 3 is a vertical longitudinal section of the same folded. Fig. 4 is a detail perspective view of one of the sides of the forward seat and its slide-rod.

Similar letters of reference indicate corresponding parts.

The object of this invention is to furnish carriage-bodies which shall be so formed that they may be extended to form two-seated carriages, or contracted or folded to form single-seated carriages, as may be required, and which shall be simple in construction and convenient in use.

The invention consists in the carriage-body formed of two parts sliding upon each other, to adapt it to be arranged for one or two seats; in the combination of the folding sides, the eye-plates, the slide-rods, and the detached seat and back with each other and with the parts of an extension carriage-body; and in the combination of the detached seat and back with the stationary seat, the slide attached to the said seat, and the parts of an extension carriage-body, as hereinafter fully described.

A represents the rear or stationary part of the carriage-body, and B represents the forward or sliding part.

The part B may be arranged to slide within the part A or upon the outer side of the said part A, as may be desired. The movement of the part B upon the part A is limited by a stop-pin, $b'$, attached to one of the said parts and working in a slot or groove, $a'$, formed in the other of the said parts.

The two parts A B are secured to each other, when extended, by the eye or hand screws C, which pass through holes in the rear part of the forward part, B, and screw into holes in the rear part, A, as shown in Fig. 2, and, when contracted, by the said screws C, which pass through holes in the forward part of the said part B and screw into screw-holes in the said part A, as shown in Fig. 3.

D is the rear or stationary seat, which is attached to the part A of the carriage-body in the usual way. E are the sides of the forward or movable seat, which are made in two parts hinged to each other, as shown in Figs. 2 and 4. To the inner side of the forward part of the sides E are attached eye-plates $e'$, the eyes of which receive the rods F, attached at their ends to the sides of the forward part, B, of the carriage-body, so that the said sides E can be slid back and forth as required. The sides E are secured in place, when adjusted, by the eye-screws G, which pass through holes in the said sides E and screw into holes in the sides of the said forward part, B, as shown in Fig. 2.

H is the forward or movable seat, to the lower side of the end parts of which are attached pins I, to enter the eyes of the eye-screws G, to keep the said seat in place. To the rear edge of the seat H is hinged the edge of a narrow strip, J, to the other edge of which is hinged the lower edge of the back K. The strip J allows the seat H and the back K to be folded together when upholstered, which could not be done were the seat and back hinged to each other directly.

The ends of the back K rest against the inner sides of the rear edges of the sides E, and the rear sides of the ends of the said back rest against the flange L, attached to the rear edges of the said sides E, where the said back K is kept in place by pivoted hooks, buttons, or other fastenings M, attached to the said sides E.

When not required for use the seat and back H J K are detached, and the sides E are folded together and turned down. The part B of the body is slipped back upon the part A, and the folded sides E are slipped in beneath the seat D. The seat and back H J K are then folded together and slipped in beneath the seat D. If desired, the rear part of the part A may be so constructed that the sides E may be slipped in beneath the seat D without being folded on themselves or attached to rods F; also, the front seat may be so constructed that it may, without being taken apart or folded, slide back over and within the seat D, or reversed and placed on the front part of parts A or B of body.

When required the carriage-body may be arranged as a bed by detaching the seat and back H J K, reversing them, placing the seat H upon a slide, N, drawn out from beneath the seat D, and resting the back K upon stop-pins or other supports O, attached to the sides of the part B of the carriage-body.

The carriage-body may be made of any desired style.

Having thus fully described my invention, I claim as new and desire to secure by Letters Patent—

1. The combination of the folding sides E, the eye-plates $e'$, the slide-rods F, and the detached seat and back H J K with each other and with the parts A B of an extension carriage-body, substantially as herein shown and described.

2. The combination of the detached seat and back H J K with the stationary seat D, the slide N, attached to the said seat D, and the parts A B of an extension carriage-body, substantially as herein shown and described.

HORACE CLINTON SEELY.

Witnesses:
 FREDERICK A. FAREIRA,
 HENRY J. SCHOCH.